(12) United States Patent
Campbell et al.

(10) Patent No.: US 7,897,225 B2
(45) Date of Patent: Mar. 1, 2011

(54) DEFORMABLE SANDWICH PANEL

(75) Inventors: Douglas Campbell, Longmont, CO (US); Michael Terifay, Longmont, CO (US); Robert Taylor, Superior, CO (US); Will Francis, Boulder, CO (US); Joe Wintergerst, Longmont, CO (US); Dana Turse, Broomfield, CO (US)

(73) Assignee: Composite Technology Development, Inc., Lafayette, CO (US)

( * ) Notice: Subject to any disclaimer, the term of this patent is extended or adjusted under 35 U.S.C. 154(b) by 2 days.

(21) Appl. No.: 12/033,584

(22) Filed: Feb. 19, 2008

(65) Prior Publication Data

US 2009/0206504 A1     Aug. 20, 2009

(51) Int. Cl.
*B65D 39/00* (2006.01)
(52) U.S. Cl. .................. 428/36.5; 428/158; 428/172; 428/411.1
(58) Field of Classification Search ............ 428/36.5, 428/158, 172, 411.1
See application file for complete search history.

(56) References Cited

U.S. PATENT DOCUMENTS

| | | |
|---|---|---|
| 5,700,337 A | 12/1997 | Jacobs et al. |
| 5,968,641 A | 10/1999 | Lewis |
| 6,702,976 B2 | 3/2004 | Sokolowski |
| 2008/0006353 A1 | 1/2008 | Elzey et al. |

FOREIGN PATENT DOCUMENTS

WO    WO 03/018853 A2    3/2003

OTHER PUBLICATIONS

Abrahamson, Erik R. et al., "Shape Memory Mechanics of an Elastic Memory Composite Resin," Journal of Intelligent Material Systems and Structures, vol. 14, pp. 623-632, Oct. 2003.
Sokolowski, Witold M. et al., "Lightweight Shape Memory Self-Deployable Structures for Gossamer Applications," 45th AIAA/ASME/ASCE/AHS/ASC Structures, Structural Dynamics & Materials Conference, 10 pages, Apr. 19-22, 2004.
PCT International Search Report and Written Opinion mailed Apr. 13, 2009, International Application No. PCT/US09/34397, 7 pages.

*Primary Examiner*—Mark Ruthkosky
*Assistant Examiner*—Lawrence D Ferguson
(74) *Attorney, Agent, or Firm*—Kilpatrick Townsend & Stockton LLP

(57) ABSTRACT

A deformable sandwich panel is disclosed according to one embodiment. The deformable sandwich panel may include first and second face sheets. These face sheets may each comprise a first and second surface and be substantially flat. The deformable sandwich panel also includes a shape memory material sandwiched between the first face sheet and the second face sheet. The shape memory material may be in continuous contact with a substantial portion of the first surface of the first face sheet and with a substantial portion of the first surface of the second face sheet. The deformable sandwich panel may be fabricated with a first shape, deformed into a second shape and then deployed back to the first shape. The first and second shapes may be maintained without mechanical loads.

14 Claims, 14 Drawing Sheets

305

310

315

DEFORMABLE SANDWICH PANEL

STATEMENT AS TO RIGHTS TO INVENTIONS MADE UNDER FEDERALLY SPONSORED RESEARCH OR DEVELOPMENT

The U.S. Government may have rights in this application pursuant to Contract No. FA9453-05-C-0025.

BACKGROUND

This disclosure relates in general to self-deployable structures and, but not by way of limitation, to shape memory structures among other things.

Thermoset sandwich materials have been used for various applications. These structures often include a core material that is often segmented and is sandwiched by two face sheets. Some materials have been manufactured using elongated curved materials (shaped like a tape measure blade) with segmented portions of core material. Some structures have been developed that are non-compliant when cured, while other thermoset sandwich material exhibit compliant behavior even after curing when slow bending forces are applied, but only with very specific core chemistries. These materials have been used in applications that include lightweight thermally conductive paneling, truss elements, antennas, etc.

SUMMARY

A deformable sandwich panel is disclosed according to one embodiment. The deformable sandwich panel may include first and second face sheets. These face sheets may each comprise a first and second surface and be substantially flat. The deformable sandwich panel also includes a shape memory material sandwiched between the first face sheet and the second face sheet. The shape memory material may be in continuous contact with a substantial portion of the first surface of the first face sheet and with a substantial portion of the first surface of the second face sheet.

In certain embodiments, through stitching that penetrates the first face sheet, the second face sheet and the shape memory material may also be included. In another embodiment an edge portion of the first surface of the first face sheet and an edge portion of the first surface of the second face sheet are coupled providing an edge termination. The stiffness of the first face sheet and the stiffness of the second face sheet may be greater than the stiffness of the shape memory material. Moreover, the stiffness of the first face sheet, the second face sheet and the shape memory material may be such that face sheet buckling and/or shape memory material failure is mitigated during bending of the deformable sandwich panel.

According to another embodiment the glass transition temperature ($T_g$) of the shape memory material is less than the survival temperature of the shape memory material. The first face sheet and/or the second face sheet may include fiber reinforced composite material. The shape memory material may comprises a polymer. The shape memory material may also be shearable and compressible.

A method for deforming a deformable sandwich panel is also disclosed according to one embodiment. The deformable sandwich panel may comprise a substantially flat first face sheet, a substantially flat second face sheet, and a shape memory core sandwiched between the first face sheet and the second face sheet. The method may include fabricating the deformable sandwich panel in a first shape; heating the deformable sandwich panel above the glass transition temperature ($T_g$) of the shape memory core; and deforming the deformable sandwich panel to a second shape, wherein said deforming includes compressing portions of the shape memory core. The deformable sandwich panel may be deformed by applying mechanical loads to the deformable sandwich panel. These mechanical loads may include pressure applied by a vacuum system.

The method may further include cooling the deformable sandwich panel below the glass transition temperature ($T_g$) of the shape memory core; removing the mechanical loads; heating the deformable sandwich panel above the glass transition temperature ($T_g$) of the shape memory core, wherein the deformable sandwich panel returns to the first shape; and cooling the deformable sandwich panel below the glass transition temperature ($T_g$) of the shape memory core; wherein the cooling restores the initial stiffness and/or strength of the deformable sandwich panel. The deformable sandwich panel may be deformed by alternately bending portions of the deformable sandwich panel up to about 180°.

In another embodiment, a deformable sandwich panel is disclosed. The deformable sandwich panel may include first and second substantially flat face sheets. The deformable sandwich panel may also include a shape memory material sandwiched between the first face sheet and the second face sheet. Moreover, the stiffness of the first face sheet, the second face sheet, and the shape memory material are such that face sheet buckling and/or shape memory material failure is/are mitigated during bending of the deformable sandwich panel.

A method is disclosed for deploying a deformable sandwich panel according to one embodiment. The deformable sandwich panel includes a flat first face sheet, a flat second face sheet, and a shape memory core sandwiched between the first face sheet and the second face sheet. The deformable sandwich panel may be fabricated in a first shape and heated to a temperature greater than or equal to the glass transition temperature ($T_g$). The deformable sandwich panel may then be folded alternately back and forth on itself. In some cases mechanical loads may then be applied. The deformable sandwich panel may then be cooled to a temperature less than or equal to the glass transition temperature ($T_g$). At this point the mechanical loads may be removed, and the deformable sandwich panel may maintain its shape and/or carry loads. At some point in time the deformable sandwich panel may be deployed by heating the deformable sandwich panel to a temperature greater than or equal to the glass transition temperature ($T_g$) and allowing the deformable sandwich panel to reconfigure into a shape substantially similar to the first shape.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one embodiment, the present disclosure provides for a deformable sandwich panel. The deformable sandwich panel may be deformed into a number of different shapes that are each capable of carrying a load. The shape of a deformable sandwich panel may be adjusted, bent, deformed, deployed, folded, etc without moving parts according to various embodiments. Other embodiments enable deformable sandwich panels to be fabricated in a first shape, stored in a second shape and deployed back to the first shape with the application of heat. Another embodiments allows a deformable sandwich panel to form multiple shapes with a single fabricated shape. Embodiments may be used in a variety of space and terrestrial applications, that include, for example, deployable antennas, deployable structures, orthopedic casts, structural members, etc. Moreover, embodiments also provide for a shape memory structure that allows bending without structural failure and/or buckling.

For example, a deformable sandwich panel may be provided that includes two substantially flat face sheets sandwiching a shape memory polymer (SMP) foam core. The SMP foam core may be in substantially continuous contact with the two face sheets. The deformable sandwich panel may be manufactured in a first shape. The deformable sandwich panel may be heated above the glass transition temperature ($T_g$) and then molded into a second shape. Mechanical loads may be used to deform the panel into the second shape and hold the deformable sandwich panel in the second shape while cooling the panel below $T_g$. Once the panel has cooled, the mechanical loads may be removed, whereupon, the deformable sandwich panel will maintain the second shape and have significant strength and/or stiffness to carry a load. In some cases, the deformable sandwich panel may be stowed or stored until deployment. The panel may be deployed or returned to the first shape by heating the panel above $T_g$ whereupon the deformable sandwich panel returns to the first shape without mechanical loading or forces. Once the panel is again cooled below $T_g$, the deformable sandwich panel may carry a load while in the first shape.

Figure 1A:
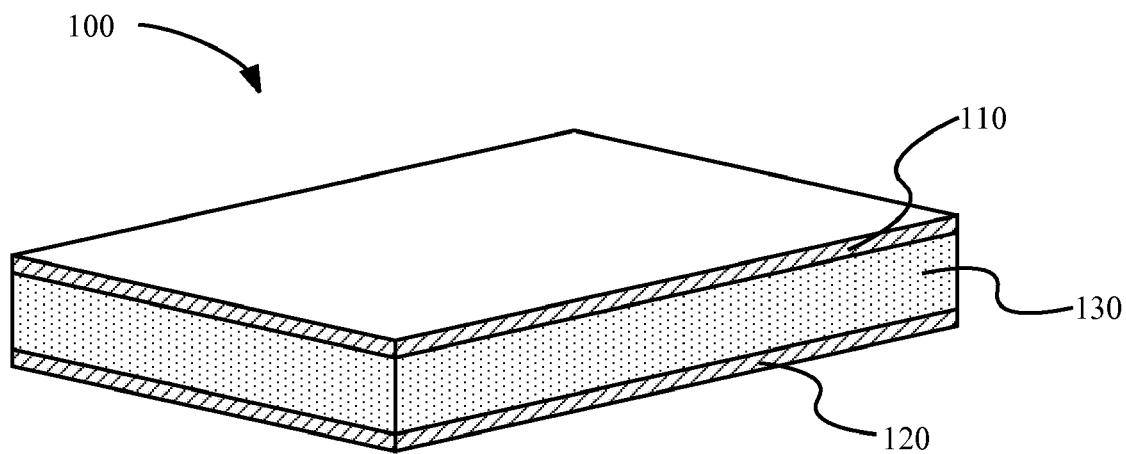
FIG. 1A shows a three dimensional view of a deformable sandwich panel according to one embodiment.
Figure 1B:
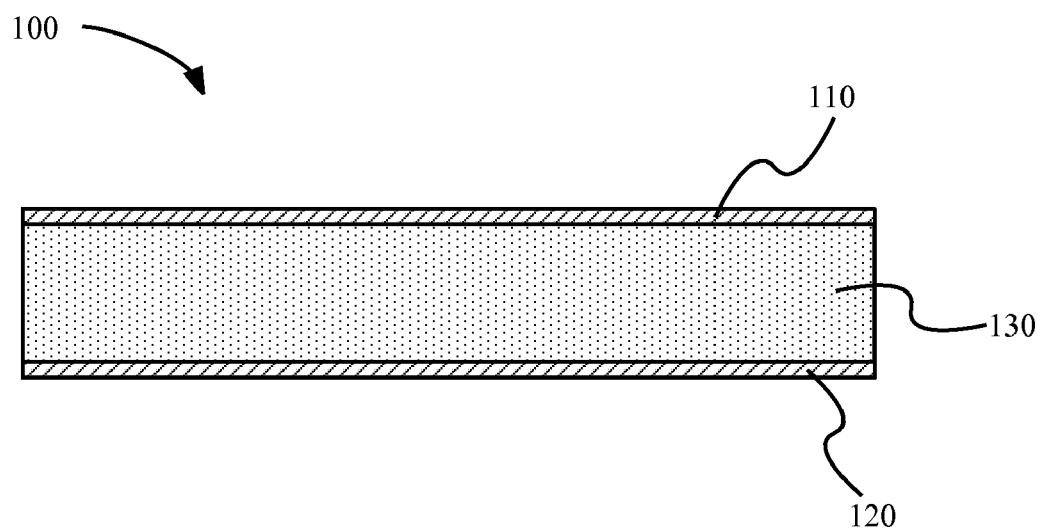
FIG. 1B shows a side view of a deformable sandwich panel according to one embodiment.
Figure 1C:
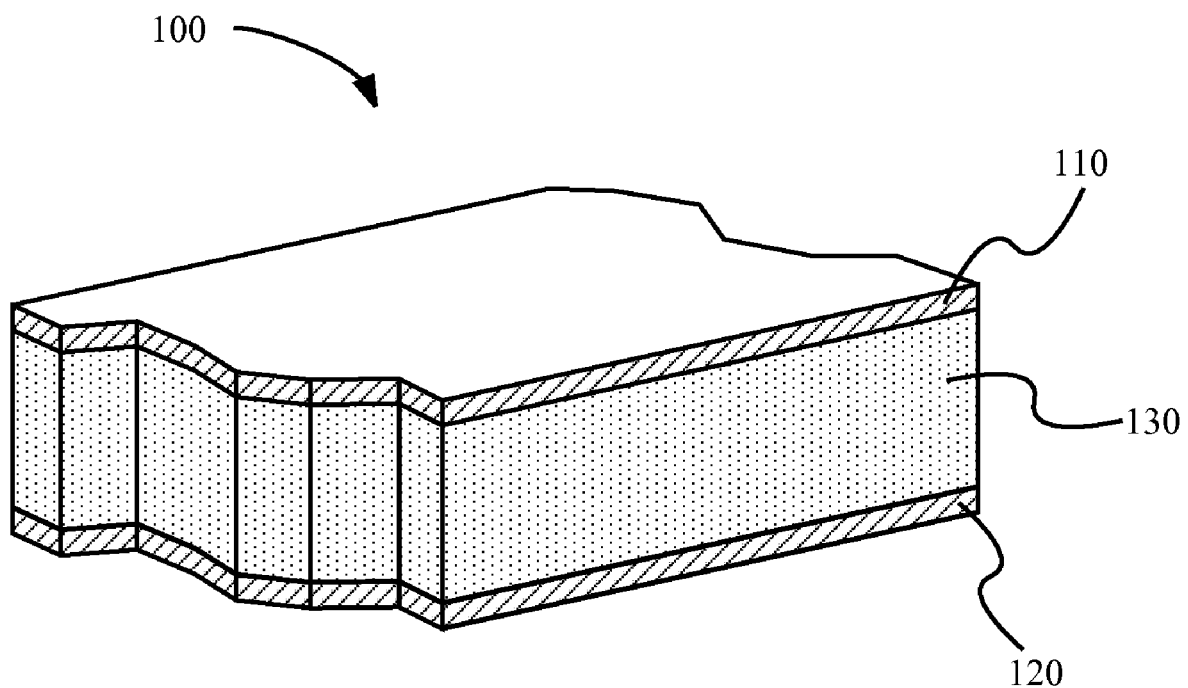
FIG. 1C shows three dimensional view of an odd shaped sandwich deformable sandwich panel according to one embodiment.

FIG. 1A shows a three-dimensional view of a deformable sandwich panel 100 according to one embodiment. FIG. 1B shows a side view of a deformable sandwich panel 100. FIG. 1C shows a three-dimensional view of an odd shaped deformable sandwich panel 100. The deformable sandwich panel 100 may be rectangular or square, or have a narrow or a large cross section. The deformable sandwich panel 100 includes a first face sheet 110, a second face sheet 120 and a shape-memory core 130. The deformable sandwich panel 100 may comprise any shape and may not be limited to thin elongated shapes. As shown in the figure, the deformable sandwich panel 100 may comprise a rectangle or square. The shape memory core 130 may be continuously in contact with both the first face sheet 110 and the second face sheet 120. That is, the core is not segmented, but instead is in mostly continuous contact with the surface of both face sheets. For example, the shape memory core 130 may be in continuous contact with about 75%, 80%, 85%, 90%, 95% or 100% of either and/or both the first face sheet 110 and the second face sheet 120.

The first and/or second face sheets 110, 120 may comprise a thin metallic material according to one embodiment. In other embodiments, the face sheets may include fiber reinforced materials. The face sheets may also comprise a composite or metallic material. Moreover, the face sheets 110, 120 are substantially flat during fabrication even though they may be deformed according to the specific application. The face sheets may also be thermally conductive.

The shape memory core 130 may comprise a shape memory polymer and/or epoxy, for example, a thermoset epoxy. The shape memory core 130 may also include either a closed or open cell foam core. The shape memory core 130 may be a polymer foam with a glass transition temperature lower than the survival temperature of the material. For example, the shape memory core may comprise TEMBO® shape memory polymers, TEMBO® foams or TEMBO® elastic memory composites.

Figure 2:
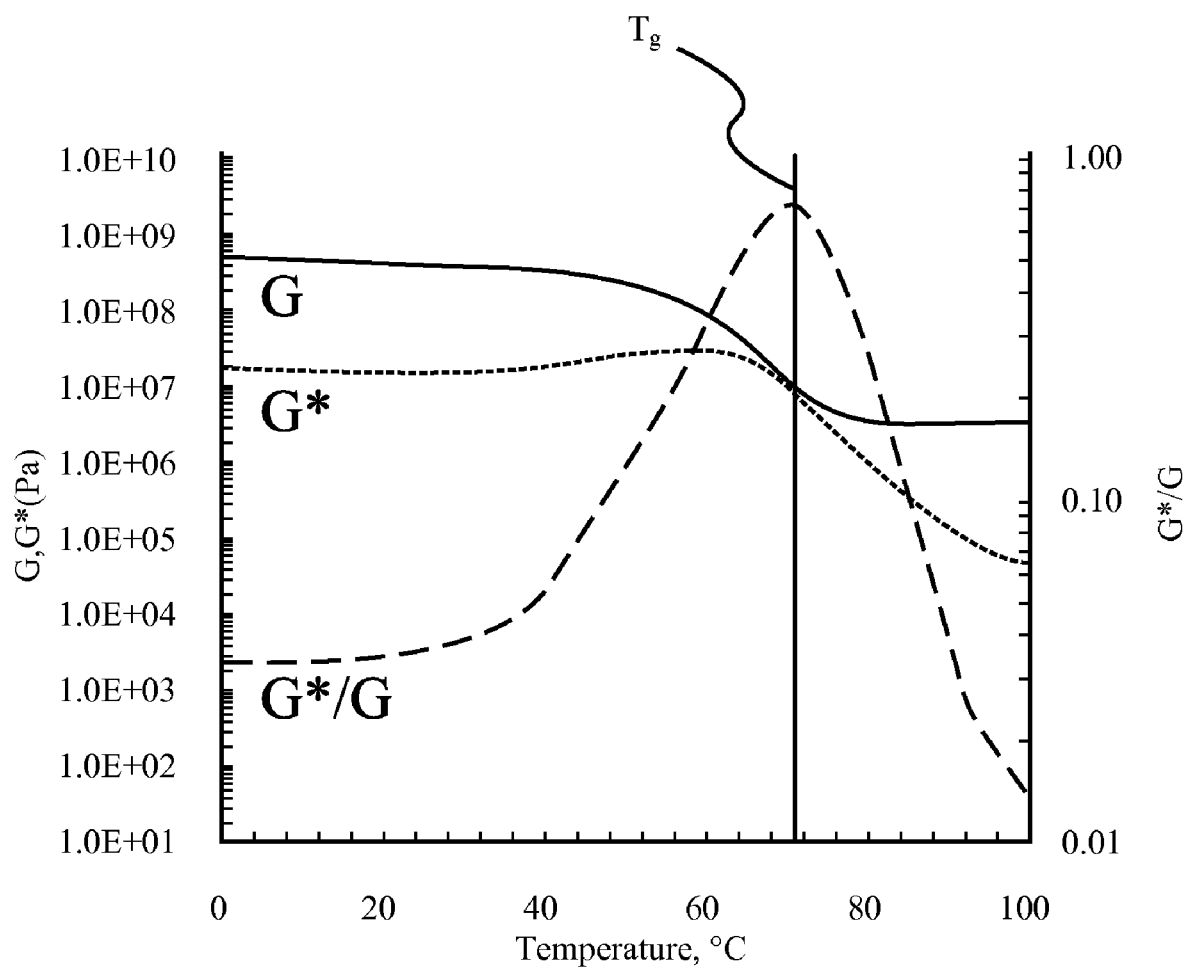
FIG. 2 shows a graph of the shear modulus, G, the complex shear modulus G*, and the ratio of the shear modulus to the complex shear modulus G*/G of an exemplary shape memory material according to one embodiment.

FIG. 2 shows a graph of the shear modulus, G, the complex shear modulus G*, and the ratio of the shear modulus to the complex shear modulus G*/G of an exemplary shape memory material according to one embodiment. The peak in the G*/G curve is defined as the glass transition temperature ($T_g$) of the shape memory material. Above $T_g$, glasses and organic polymers become soft and capable of plastic deformation without fracture. Below $T_g$, the joining bonds within the material are either intact, or when cooling increase as the material cools. Thus, below $T_g$, materials often become stiff, brittle and/or strong.

Figure 3:
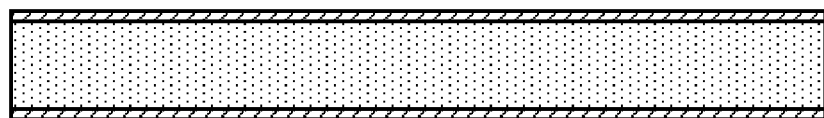
FIG. 3 shows a deformable sandwich panel in an initial resting state, a bent state and a compressed and bent state according to one embodiment.
Figure 3:
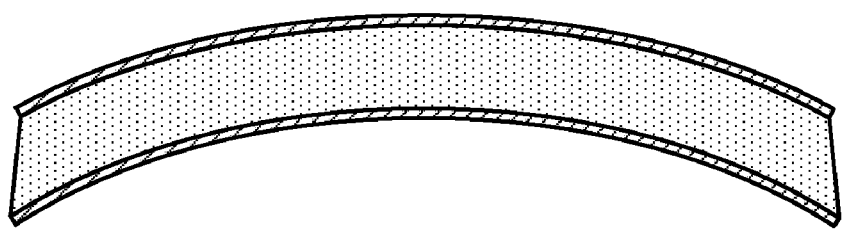
Figure 3:
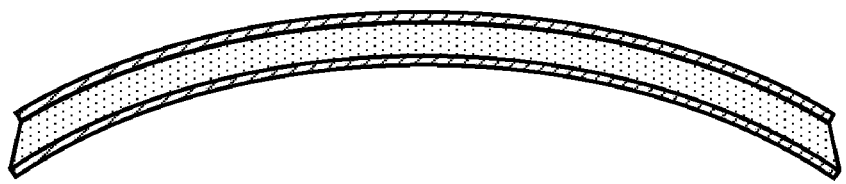

FIG. 3 shows a deformable sandwich panel in an initial resting state 305, a bent state 310 and a compressed and bent state 315 according to one embodiment. The core shear is highest at the edge of the panel and the magnitude of this shear is dependent on the angle of bending (assuming a constant induced radius of curvature).

Figure 4:
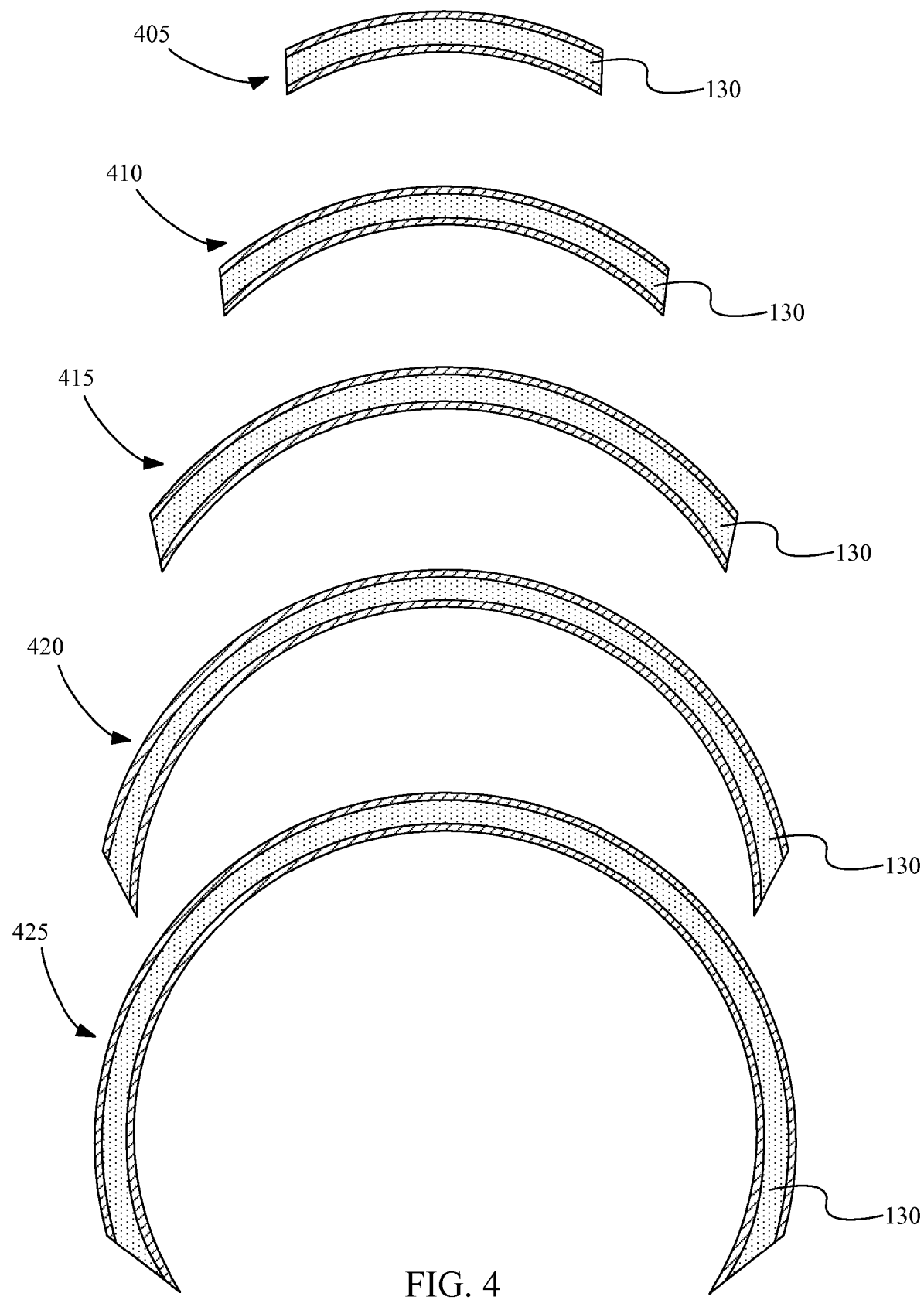
FIG. 4 shows an example of shear increases in a memory polymer core panel as the panel is wrapped with greater wrap angles, each of which show the same panel dimensions and radius of curvature.

As shown in FIG. 4, the shear increases at the edges of a memory polymer core panel as the panel is wrapped with greater wrap angles. Panel 405 is wrapped 60°, panel 410 is wrapped 90°, panel 415 is wrapped 120°, panel 420 is wrapped 180°, and panel 425 is wrapped 210°. Accordingly, the shear-strain capability of the core 130 limits the angle that a deformable sandwich panel may be bent.

Figure 5C:
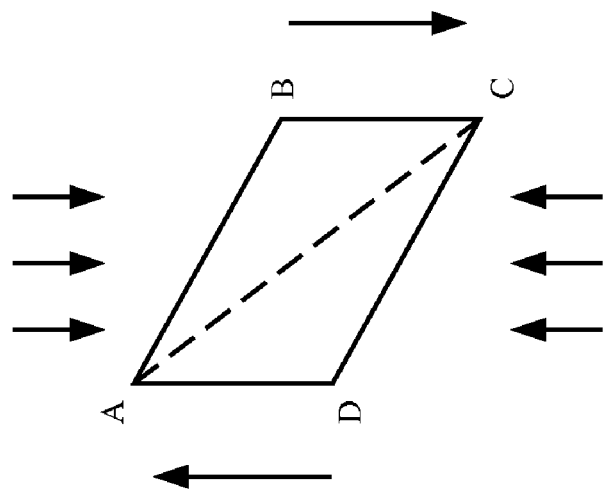
FIG. 5C shows a diagram of a deformable sandwich panel undergoing shear-compression deformation according to one embodiment.
Figure 5B:
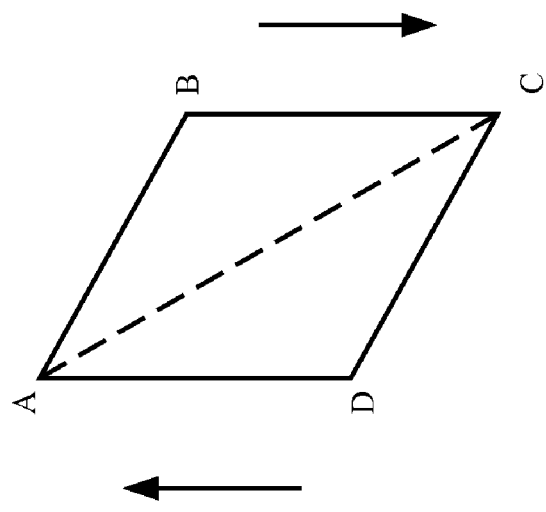
FIG. 5B shows a diagram of a deformable sandwich panel undergoing pure shear deformation according to one embodiment.
Figure 5A:
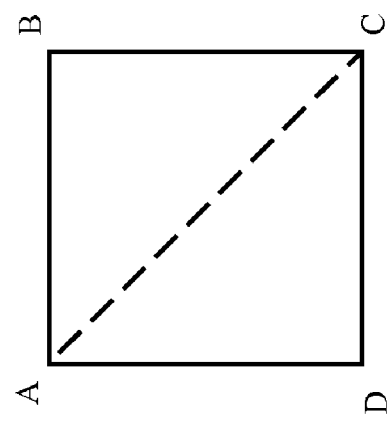
FIG. 5A shows a diagram of a deformable sandwich panel in its initial shape according to one embodiment.

The shear-strain capability may be determined by a maximum diagonal tensile strain as shown in FIGS. 5A, 5B and 5C. An initially square element of the core material (FIG. 5A) that is deformed in pure shear (FIG. 5B) will undergo a diagonal tensile stain (between corners A and C in FIG. 5B), which can be eliminated or greatly reduced by the application of compression as shown in FIG. 5C. Accordingly, embodiments enhance the shear strain performance of a shape memory core by applying compression during shearing. The line AC in FIG. 5A is stretched in FIG. 5B due to shear. Compressing the panel as shown in FIG. 5C reduces the stretching in the line AC.

Figure 6A:
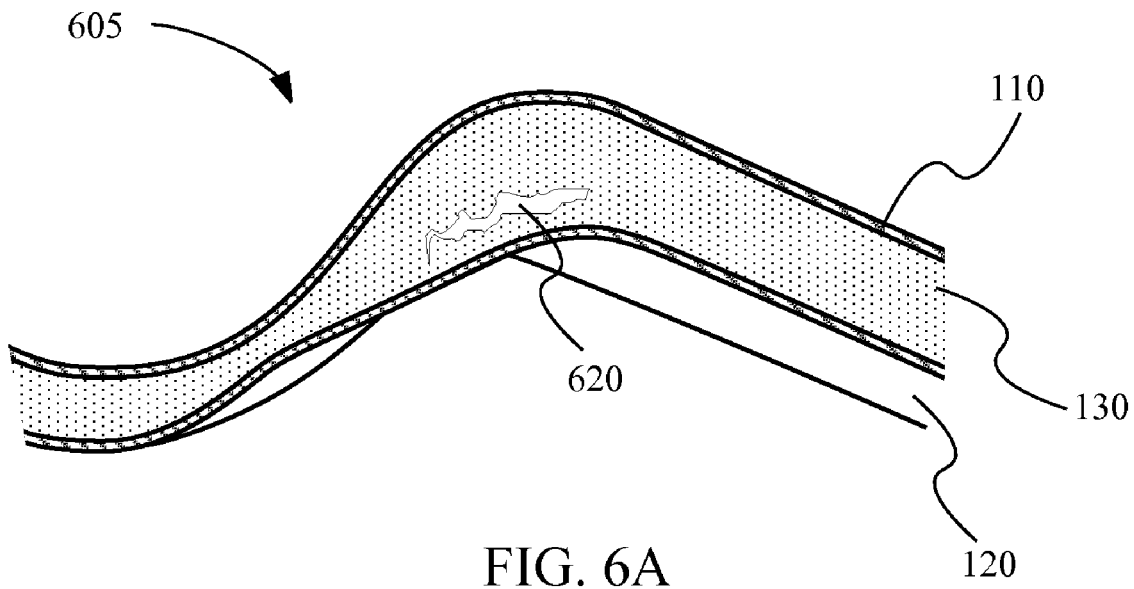
FIG. 6A shows an example of core failure in a deformable sandwich panel.
Figure 6B:
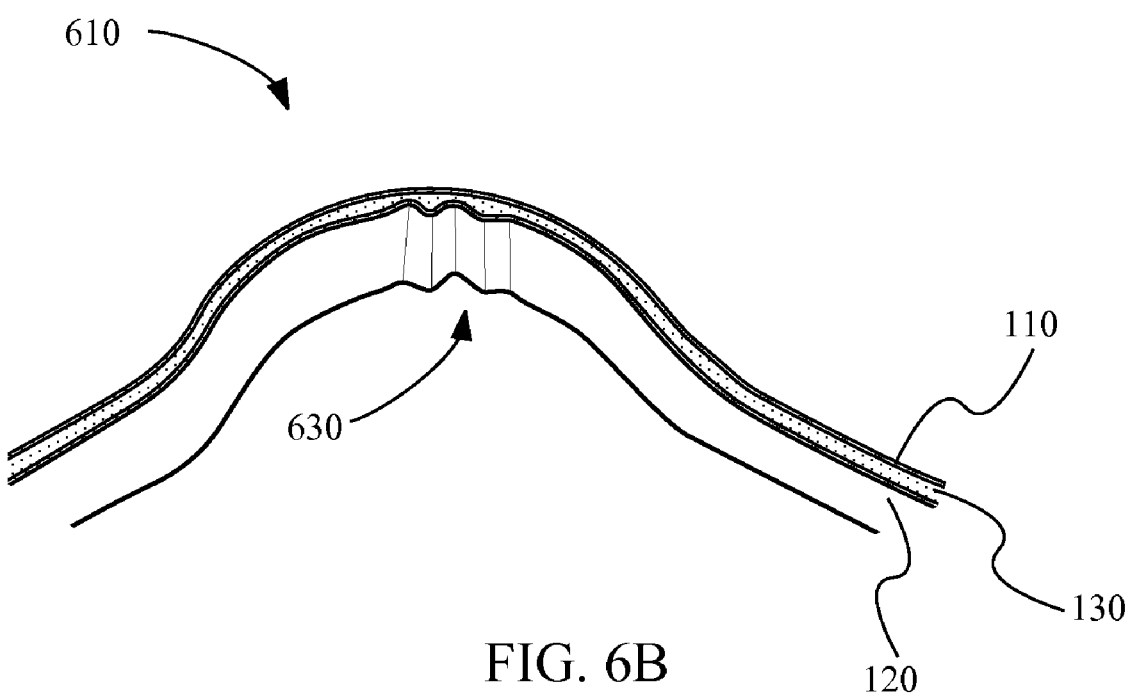
FIG. 6B shows an example of local face sheet buckling in a deformable sandwich panel.

FIGS. 6A and 6B show two examples of deformable sandwich panel failure. The shape memory core 130 shown is a shape memory polymer (SMP) foam core. The panels shown in FIGS. 6A and 6B were fabricated flat and bent until some form of material failure occurred. FIG. 6A shows an example of failure 620 in the foam core 130 at the bend joint of a deformable sandwich panel 605. FIG. 6B shows an example of local face sheet buckling 630 in a deformable sandwich panel 610 in the proximity of the joint. Embodiments may eliminate modes of failure, such as those shown in FIGS. 6A and 6B, even for very large angles of curvature, for example, greater than 180°. Embodiments may eliminate modes of failure without segmenting the SMP foam core into discrete sections. Moreover, embodiments may also eliminate modes of failure without modifying the SMP foam core chemistry.

Figure 7A:
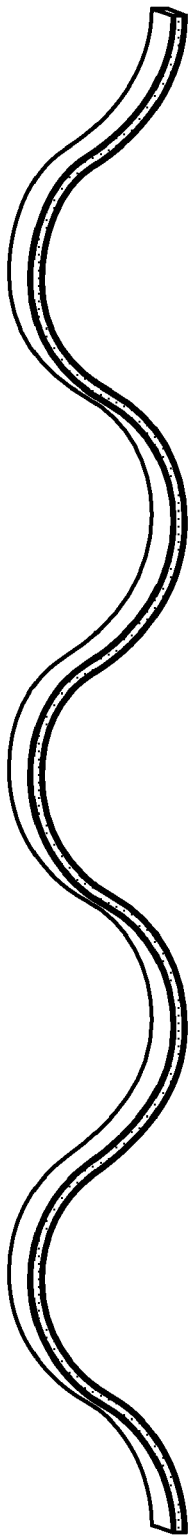
FIGS. 7A, 7B, 7C, 7D, 7E and 7F show examples of a deformable sandwich panel alternately folded on itself with different linear compaction ratios according to one embodiment.
Figure 7B:
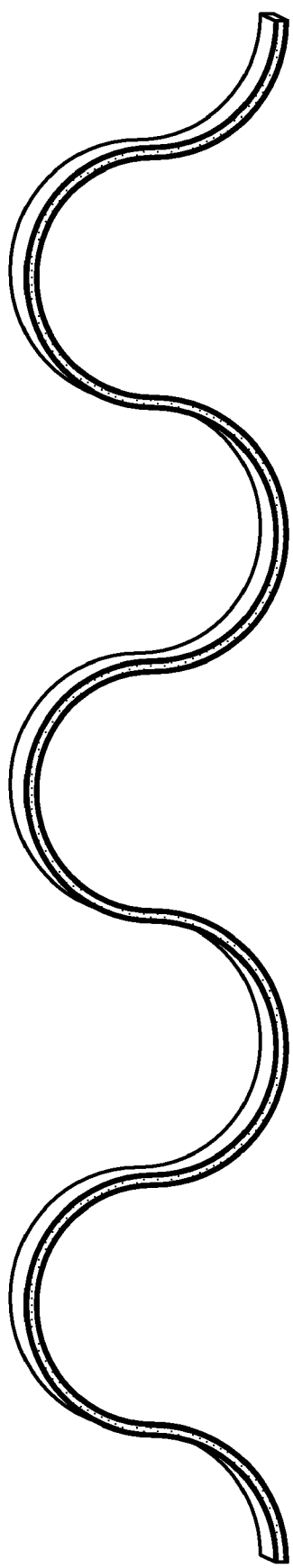
Figure 7C:
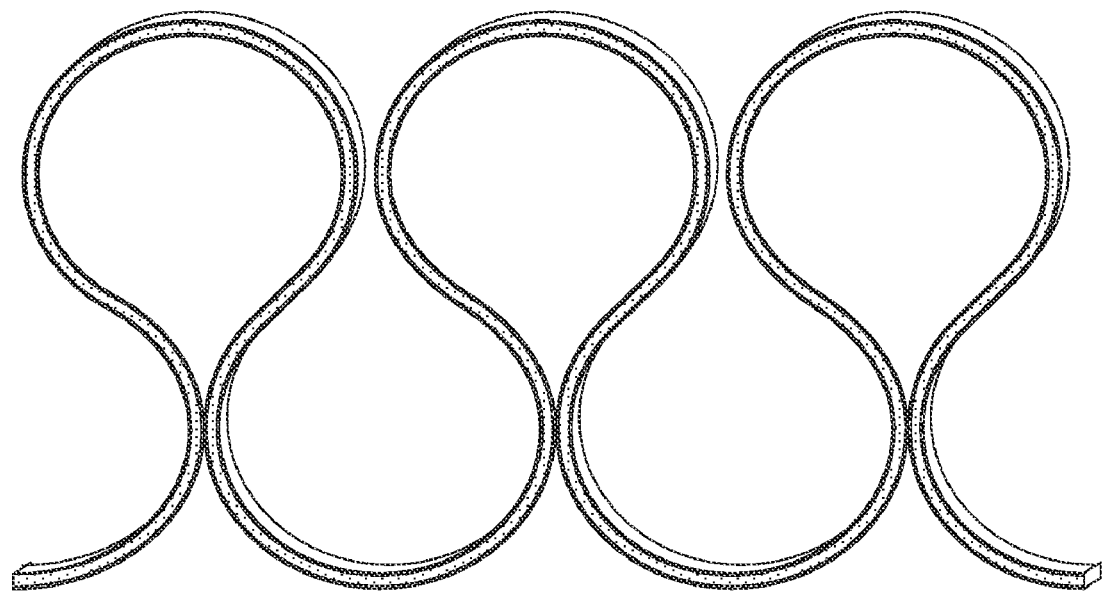
Figure 7D:
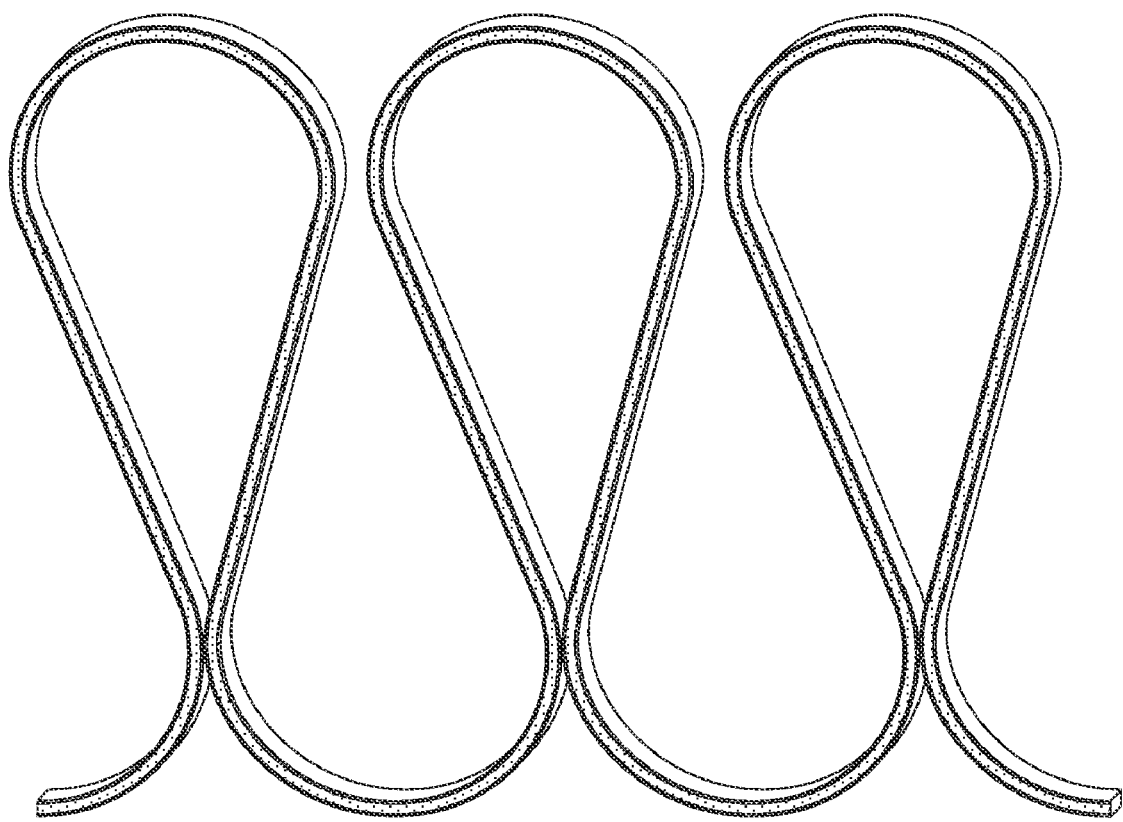

FIGS. 7A, 7B, 7C and 7D show examples of a deformable sandwich panel alternately folded on itself with different linear compaction ratios according to one embodiment. A panel may be fabricated in a first shape and then compacted into a second shape, such as the folded shapes shown in these figures. The panels may then be deployed back to the first shape by applying heat using various embodiments described herein. In each of these figures, the deformable sandwich panel is alternately folded back upon itself. This folding technique reverses the shear bends within the panel core. The folding may also reduce buildup of shear strains within the core. Moreover, the folded panels may be stored in a small compact volume. The radius of curvature of these folded deformable sandwich panels may be as low as 2", 2.5", 3", 3.5", 4", 4.5", etc. FIG. 7A shows a deformable sandwich panel with a linear compaction ratio of 1.23. The linear compaction ratio is the ratio of the length of the structure in its original state divided by the length of the structure in its compact state. FIG. 7B shows a deformable sandwich panel with a linear compaction ratio of 1.61. FIG. 7C shows a deformable sandwich panel with a linear compaction ratio of 4.66. FIG. 7D shows a deformable sandwich panel with a linear compaction ratio of 5.75.

Figure 7E:
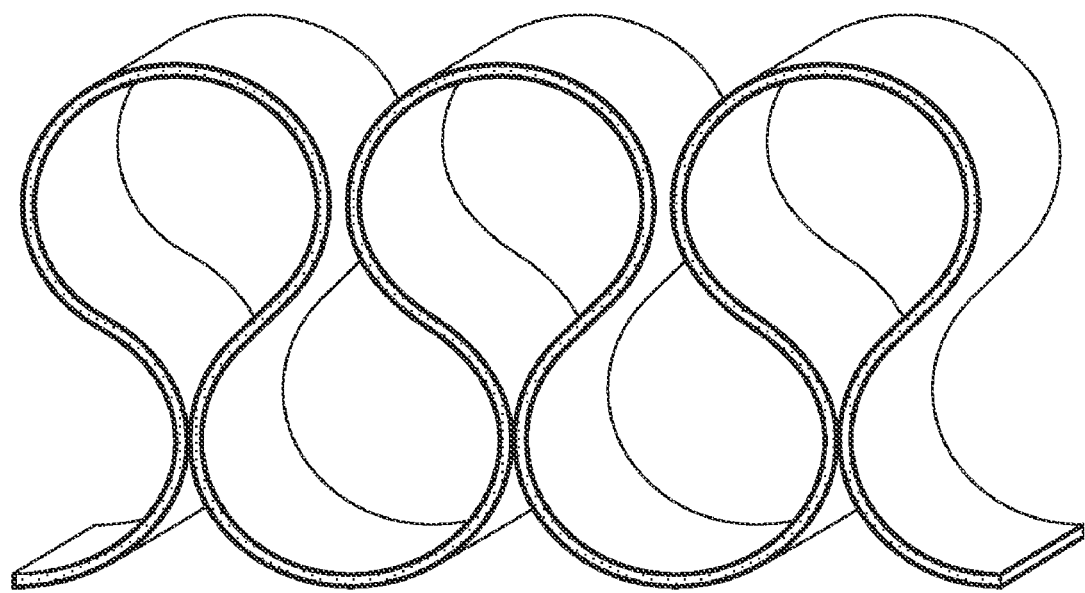
Figure 7F:
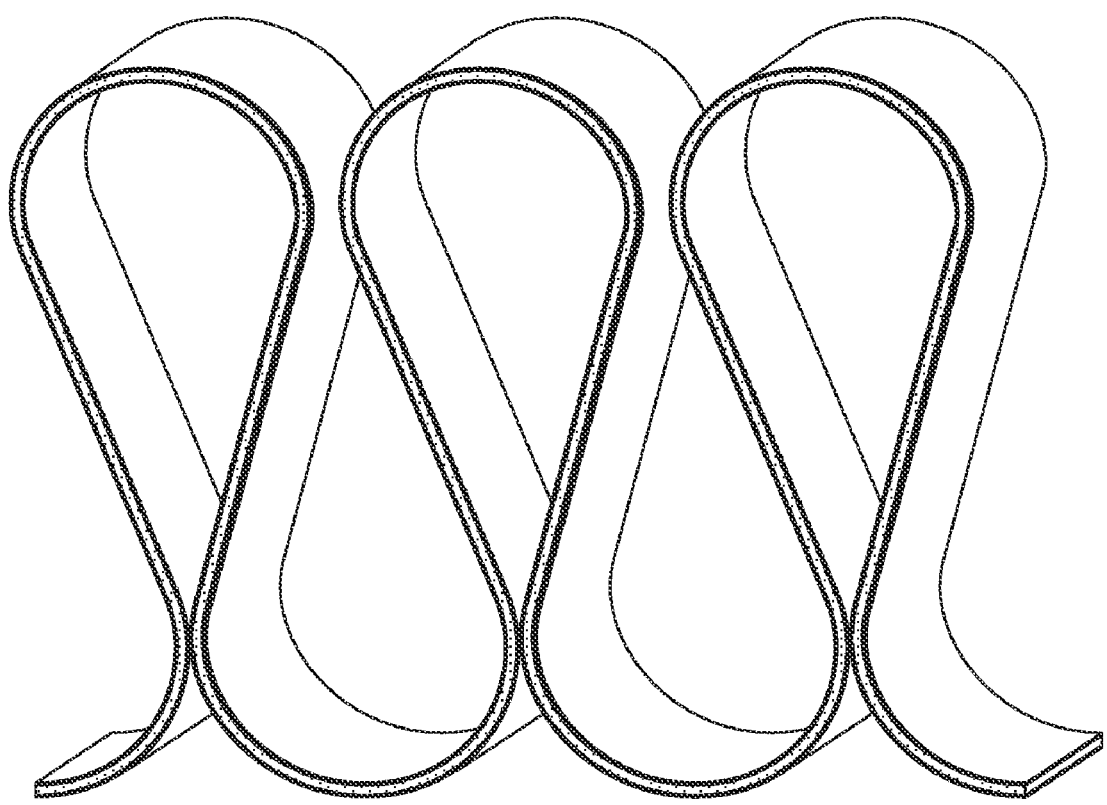

FIGS. 7E and 7F show deformable sandwich panels with a thick cross section. The deformable sandwich panel shown in FIG. 7E has a linear compaction ratio of 4.66 and the deformable sandwich panel shown in FIG. 7F has a linear compaction ratio of 5.75.

Figure 8:
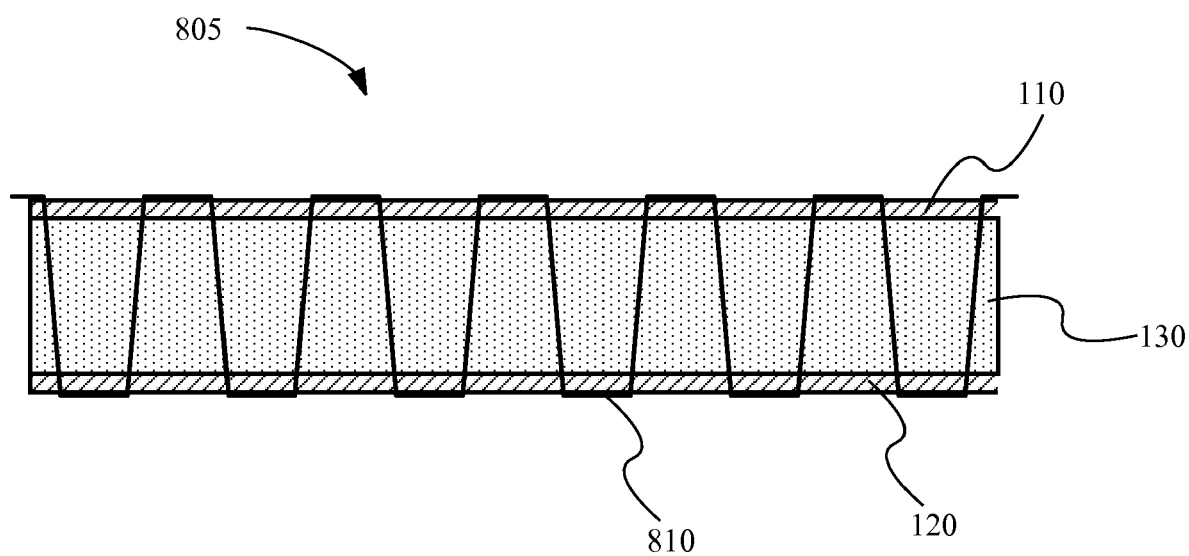
FIG. 8 shows a side view of a deformable sandwich panel with through stitching according to one embodiment.

FIG. 8 shows a side view of a deformable sandwich panel 805 with through stitching 810 according to one embodiment. The through stitching 810 may penetrate through both face sheets 110, 120 and a SMP core 130. The through stitching 810 may reduce tensile failure in the core material 130.

Figure 9A:
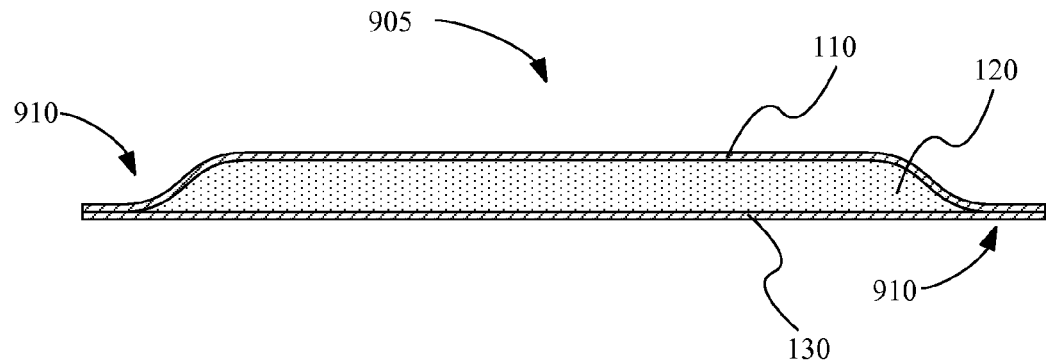
FIG. 9A shows a deformable sandwich panel with face sheet end terminations according to one embodiment.
Figure 9B:
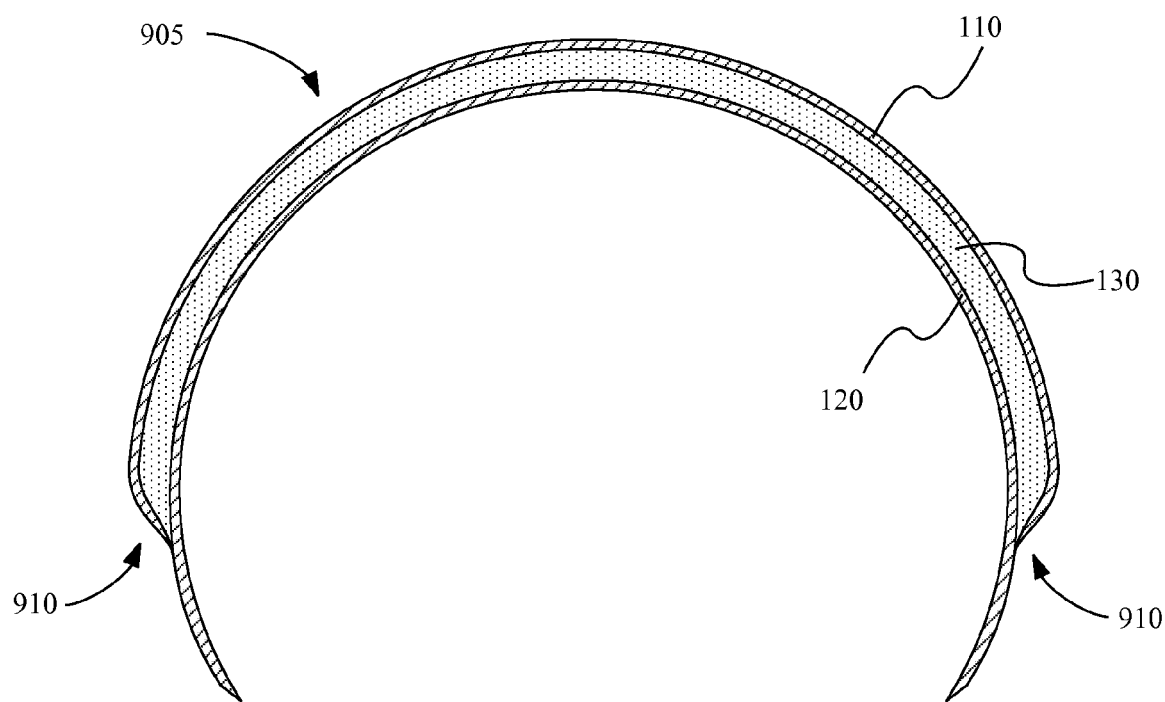
FIG. 9B shows the deformable sandwich panel with terminations in FIG. 9A in a bent and compressed state.

FIG. 9A shows a deformable sandwich panel 905 with the top face sheet 110 and the bottom face sheet 120 coupled together on the edges providing a termination 910 according to one embodiment. These terminations 910 tie the top face sheet 110 and the bottom face sheet 120 together to eliminate relative shearing, and force through-thickness compression in the core 130. FIG. 9B shows the deformable sandwich panel 905 with terminations 910 in FIG. 9A in a bent and compressed state.

Figure 10:
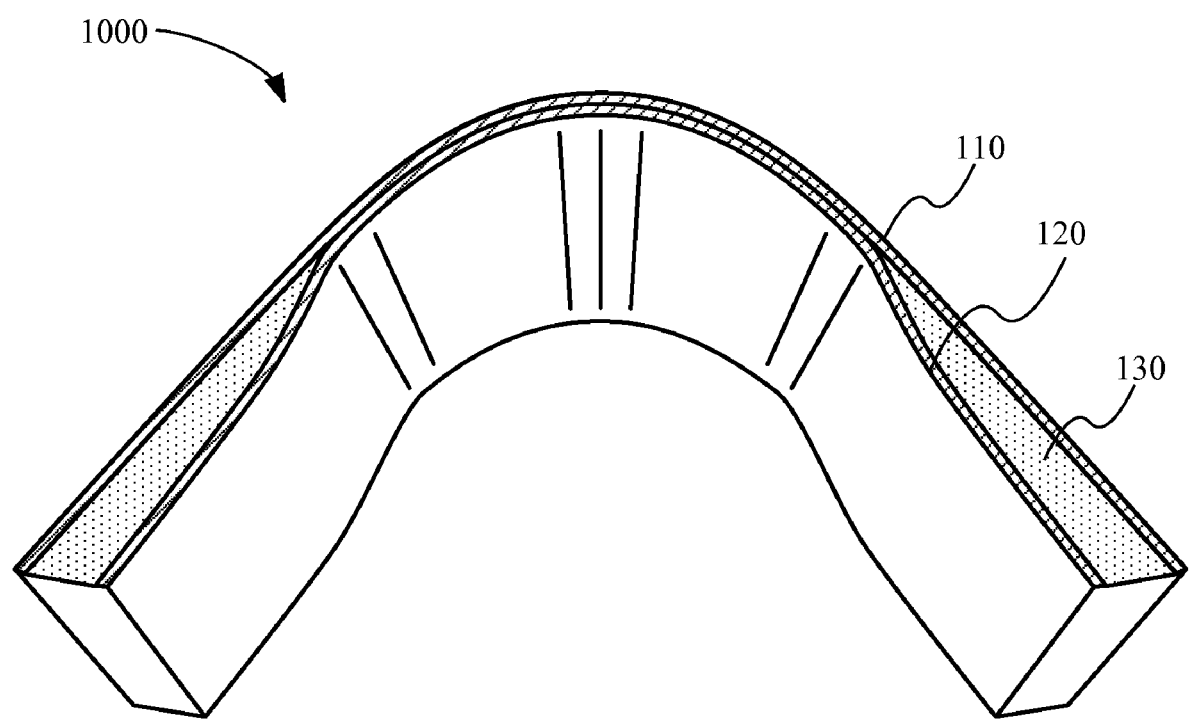
FIG. 10 shows a deformable sandwich panel hinge blade according to one embodiment.

FIG. 10 shows a deformable sandwich panel hinge blade 1000 according to one embodiment. A non-edge portion may include a top face sheet 110 and a bottom face sheet 120 coupled together. The sandwich panel hinge blade 1000 may be fabricated in the open state, and heated and deformed in the closed state. The sandwich panel hinge blade 1000 may then be cooled below $T_g$ and then stored in the closed state. The sandwich panel hinge blade 1000 may be deployed by heating the sandwich panel hinge blade 1000 above $T_g$ whereupon the sandwich panel hinge blade 1000 changes to its open state.

Figure 11:
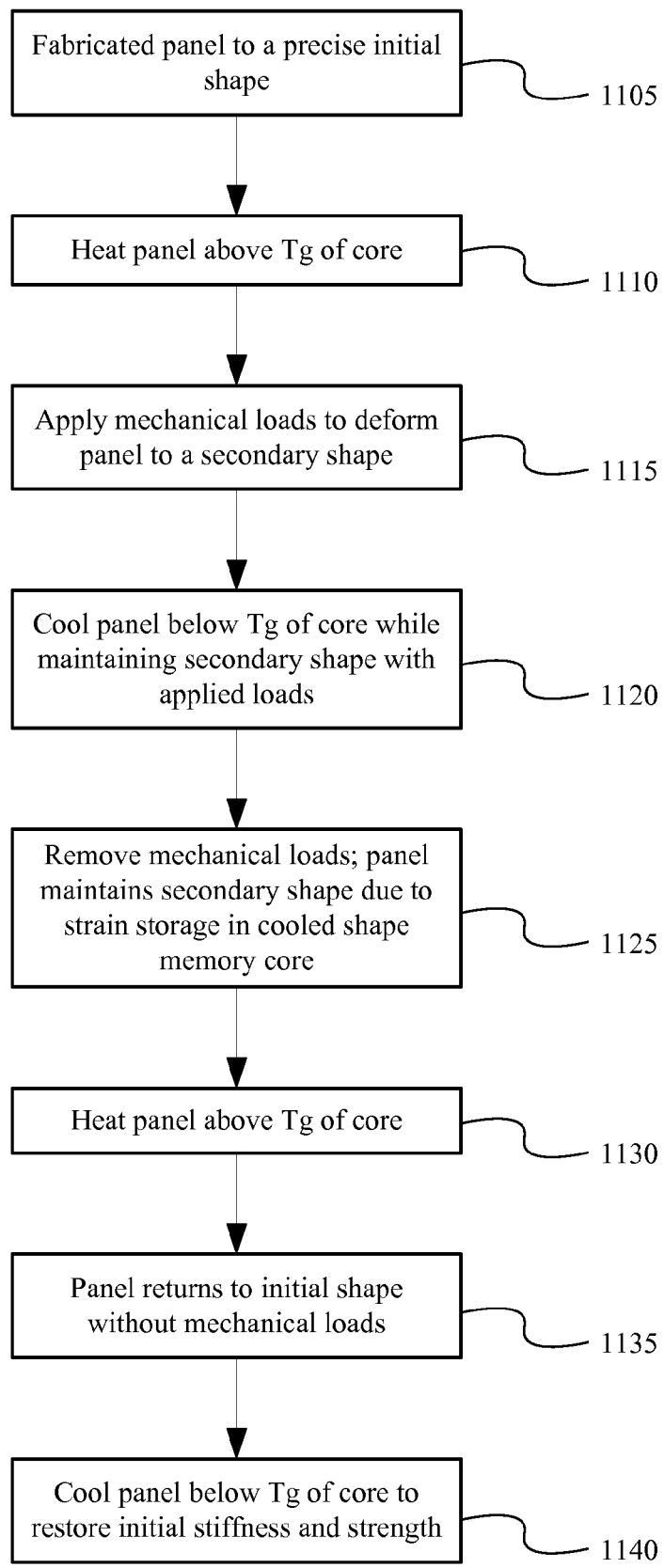
FIG. 11 shows a flowchart depicting a method for packing and deploying a deformable sandwich panel according to one embodiment.

FIG. 11 shows a flowchart depicting a method for packing and deploying a deformable sandwich panel according to one embodiment. The deformable sandwich panel is fabricated panel to a precise initial shape in block 1105. The deformable sandwich panel may be fabricated according to the various embodiments. The deformable sandwich panel may then be heated to a temperature above the $T_g$ of the deformable sandwich panel core at block 1110; whereupon mechanical loads are applied to the deformable sandwich panel to deform the deformable sandwich panel to a secondary shape at block 1115. The mechanical loads may bend or manipulate the deformable sandwich panel in such a way that core shearing and/or core compression may occur. The deformable sandwich panel is then cooled below $T_g$ of the core while maintaining secondary shape with applied loads at block 1120. The mechanical loads may include a vacuum pressure system that holds the deformable sandwich panel in the secondary shape while cooling the deformable sandwich panel. The mechanical loads may then be removed at block 1125, whereupon the deformable sandwich panel maintains the secondary shape due to strain storage in the cooled shape memory core. The deformable sandwich panel may carry loads while in the secondary state in a temperature below $T_g$.

The panel may then be deployed by heating the panel above the core's $T_g$ at block 1130. The deformable sandwich panel then returns to the initial shape without the use of mechanical loads at block 1135; whereupon the deformable sandwich panel may be cooled below $T_g$ of the core to restore initial stiffness and strength at block 1140.

Those skilled in the art will recognize many applications and/or modifications that may apply embodiments without varying from the spirit and/or scope of the invention.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

While the principles of the disclosure have been described above in connection with specific apparatuses and methods, it is to be clearly understood that this description is made only by way of example and not as limitation on the scope of the disclosure.

What is claimed is:

1. A deformable sandwich panel comprising:
a first face sheet comprising a first and second surface, wherein the first face sheet is substantially flat;
a second face sheet comprising a first and second surface, wherein the second face sheet is substantially flat; and
a shape memory material sandwiched between the first face sheet and the second face sheet, wherein:
the shape memory material has a default first shape;
the shape memory material is mechanically deformable to a second shape when above a glass transition temperature;
the shape memory material will return to the default first shape when substantially mechanically unloaded above the glass transition temperature; and
the stiffness of the first face sheet and the stiffness of the second face sheet is greater than the stiffness of the shape memory material above and below the glass transition temperature,
wherein the sandwich panel is deformable through shearing of the shape memory material, and
wherein the shape memory material comprises a polymer having a glass transition temperature (Tg) that is less than a survival temperature.

2. The deformable sandwich panel according to claim 1, wherein the shape memory material is in continuous contact with a substantial portion of the first surface of the first face sheet and with a substantial portion of the first surface of the second face sheet.

3. The deformable sandwich panel according to claim 1, wherein an edge portion of the first surface of the first face sheet and an edge portion of the first surface of the second face sheet are coupled.

4. The deformable sandwich panel according to claim 1, wherein the stiffness of the first face sheet, the second face sheet and the shape memory material are such that either or both of face sheet buckling and shape memory material failure is mitigated during deformation through shape memory material shear.

5. The deformable sandwich panel according to claim 1, wherein one or both of the first face sheet and the second face sheet includes fiber reinforced composite material.

6. The deformable sandwich panel according to claim 1, wherein the panel is deformable by compressing a portion of the shape memory material, whereby the compression prevents core failure.

7. The deformable sandwich panel according to claim 1, further comprising stitching, wherein the stitching penetrates the first face sheet, the second face sheet and the shape memory material.

8. The deformable sandwich panel according to claim 1, wherein the shape memory material comprises a foam.

9. A deformable sandwich panel comprising:
a shape memory foam having a top surface and a bottom surface, wherein the shape memory foam is shearable and compressible, wherein:
the shape memory foam has a default first shape;
the shape memory foam is mechanically deformable to a second shape when above a glass transition temperature;
the shape memory foam will return to the default first shape when substantially mechanically unloaded above the glass transition temperature;
a top face sheet adhered with the top surface of the shape memory foam, wherein the top face sheet comprises a stiffness greater than the stiffness of the shape memory foam above and below the glass transition temperature; and
a bottom face sheet adhered with the bottom surface of the shape memory foam, wherein the bottom face sheet comprises a stiffness greater than the stiffness of the shape memory foam above and below the glass transition temperature, and
wherein the deformable sandwich panel is fabricated in a first configuration and can be deformed into a second configuration when the shape memory foam is heated above the glass transition temperature of the shape memory foam such that the second configuration is substantially maintained while the temperature of the shape memory foam is less than glass transition temperature.

10. The deformable sandwich panel according to claim 9, wherein the deformable sandwich panel returns to the first configuration when the temperature of the shape memory foam is increased above the glass transition temperature.

11. The deformable sandwich panel according to claim 9, wherein the deformable sandwich panel is fabricated in a first configuration and can be deformed into a second configuration by compressing a portion of the shape memory foam.

12. The deformable sandwich panel according to claim 9, wherein the sandwich panel is deformable through shearing of the shape memory material.

13. The deformable sandwich panel according to claim 9, wherein a portion of the shape memory material compresses during deformation.

14. A deformable sandwich panel comprising:
a first face sheet comprising a first and second surface, wherein the first face sheet is substantially flat;
a second face sheet comprising a first and second surface, wherein the second face sheet is substantially flat;
a shape memory material sandwiched between the first face sheet and the second face sheet, wherein the stiffness of the first face sheet and the stiffness of the second face sheet is greater than the stiffness of the shape memory material; and
stitching, wherein the stitching penetrates the first face sheet, the second face sheet and the shape memory material,
wherein the sandwich panel is deformable through shearing of the shape memory material.

* * * * *